Figure 1:
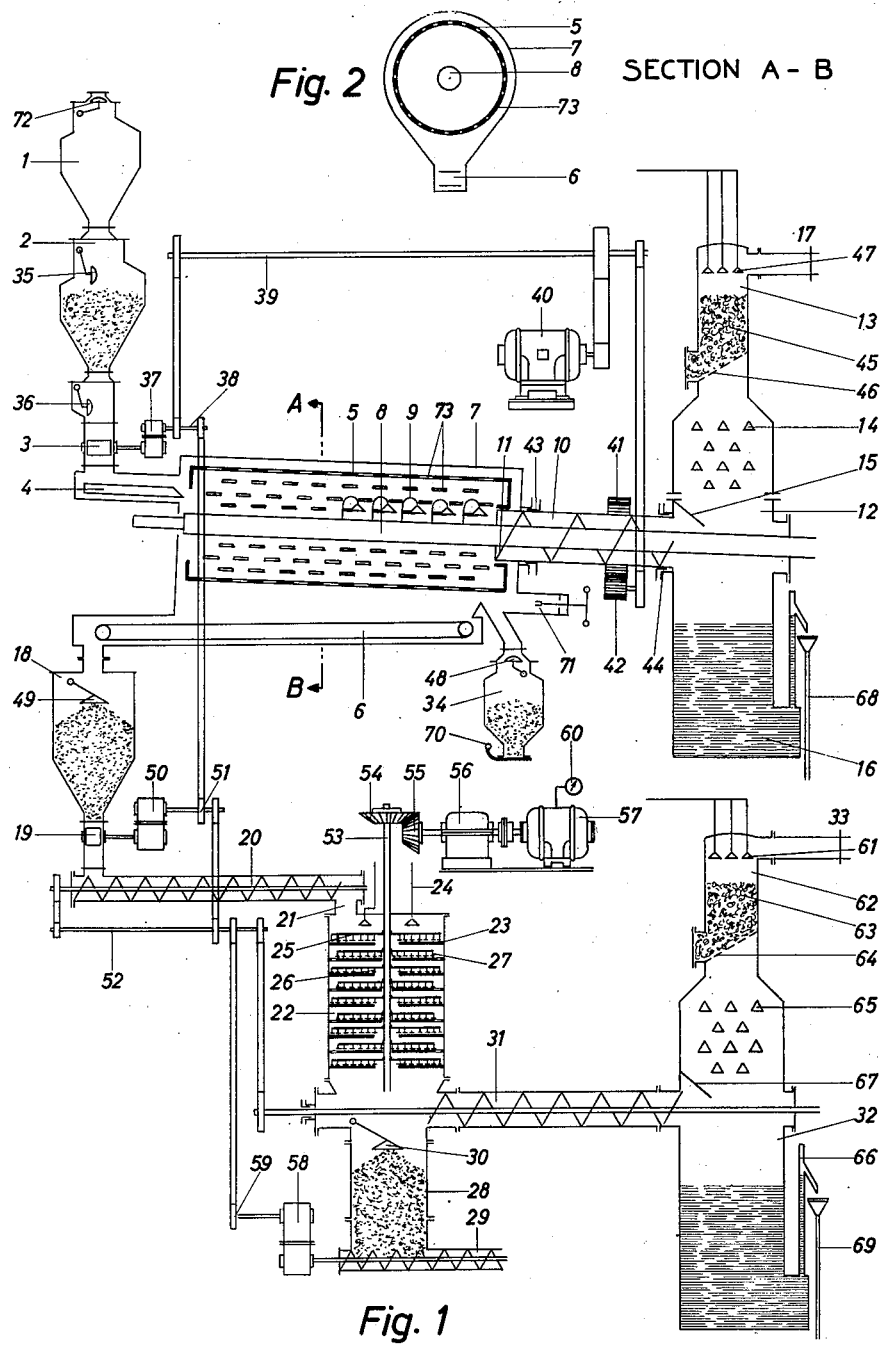

Fig. 2 SECTION A-B

INVENTORS
FRIEDBERT RITTER & FELIX WALTER
BY
THEIR ATTORNEYS

United States Patent Office 2,701,190
Patented Feb. 1, 1955

2,701,190
PROCESS FOR THE CONTINUOUS MANUFACTURE OF ACETYLENE

Friedbert Ritter, Knapsack, Bezirk Koln, and Felix Walter, Koln-Klettenberg, Germany, assignors to Knapsack-Griesheim Aktiengesellschaft, Knapsack, near Cologne, Germany, a corporation of Germany Application October 3, 1950, Serial No. 188,261
Claims priority, application Germany October 10, 1949
3 Claims. (Cl. 48—216)

This invention relates to an improved process for the manufacture of acetylene from calcium carbide and water with the simultaneous production of dry calcium hydroxide.

In the processes so far known for the continuous manufacture of acetylene from calcium carbide and water with the simultaneous production of dry calcium hydroxide definite sizes of powdery or more or less coarse-grained carbide are used. But the production of these definite sizes demands a sorting of the broken carbide or of the carbide obtained by disintegration by direct cooling of the molten material and causes unnecessary costs and losses of acetylene.

Although in these known methods for the production of acetylene, in which the decomposition of the calcium carbide is carried out in sieve drums, vibrating sieves, etc., small quantities are broken off by the movement of the carbide in the form of fine-grained carbide and carbide dust, which is undesirable and makes it necessary to remove the fine-grained carbide from the calcium hydroxide either by wind sifting or through a special subsequent decomposition, which only rarely produces the desired result. After the wind sifting there still remain small quantities of carbide dust in the calcium hydroxide, since the subsequent decomposition is carried out with insufficient quantities of water for complete decomposition. This is done in order to avoid an over-moistening of the calcium hydroxide, which contains only small quantities of carbide and therefore only develops a small heat of reaction. If more water is used, then the calcium hydroxide is too wet and easily clogs the meshes of the sieve, the grates, etc., thus causing undesired disturbances in production. If too small quantities of water are used for the decomposition of the remaining carbide, a calcium hydroxide is obtained which contains practically no free water, but still contains small quantities of carbide. A subsequent reaction of the remaining carbide in the moist calcium hydroxide can thus no longer take place. This method of working has been followed hitherto also for the reason that it is impossible to determine the correct dosage of water required for subsequent decomposition owing to the varying percentage of calcium carbide in the commercial carbide and to the ever varying quantity of carbide contained in the calcium hydroxide. For this dosage is generally carried out according to the quantity of acetylene developed in a unit of time. It is therefore quite impossible in the long run to determine correctly the quantity of water necessary for the subsequent decomposition so that either non-reacted carbide is contained in the calcium hydroxide, or the calcium hydroxide has an undesirable degree of moistness, which can lead to disturbances in production and difficulties in the further transporting. The introduction of an independent subsequent decomposition device separated from the main decomposition device leads to losses of acetylene and is accompanied by great danger above all in the transporting into the subsequent decomposition device without protective gas. For if the carbide is decomposed with water at temperatures over 100° C. in order to obtain a very dry reaction mixture, as in decomposition devices equipped with sieves, etc., in order to avoid stoppage of the fall-through apertures, and if the calcium hydroxide still contains residues of carbide, the highly heated acetylene easily forms a gas mixture with the air—as is well known—which can ignite of its own accord through the hydrogen phosphide which is always present in crude acetylene. This is the case above all at temperatures above 100° C. (see "Das Azetylen" by J. H. Vogel, published by Otto Spamer, 2nd edition, Leipzig, 1923, pp. 71–72). By the process described in U. S. Patent 1,916,592 and Reissue 20,527 it is possible to avoid these dangers, since a carbide free calcium hydroxide is obtained here in a single stage. But this process can only be used to advantage for the treatment of fine-grained carbide, and is not suitable for coarse-grained or unsorted carbide.

In accordance with the present invention the improvement as compared with the processes hitherto known for the manufacture of acetylene from carbide and water with production of dry calcium hydroxide, in which the reaction heat developed is drawn off by the evaporation of a certain surplus quantity of water present and the decomposition is carried out with continual separation of the fine-grained reaction components, consists in that the decomposition of the carbide is carried out in two separate stages. In the first decomposition stage, besides the calcium hydroxide formed, the fine-grained carbide is continually separated off, and the acetylene produced by the decomposition of the carbide with water in the first decomposition stage and the acetylene produced in the second decomposition stage by the decomposition of the fine-grained carbide contained in the separated calcium hydroxide is discharged in two independent currents of acetylene which can be cooled by direct cooling with water to a predetermined temperature, and the quantity of which acetylene can be determined. This is achieved by the uninterrupted formation of a gastight sealing of a definite minimum substance level, so that in one decomposition apparatus two independent gas chambers are formed. This sealing is continually formed anew by the calcium hydroxide formed in the first decomposition stage and by the undecomposed fine-grained carbide; this solid mixture does not come into contact with the outside air during this process.

By this method losses of acetylene and serious dangers which would otherwise occur through self-ignition of the acetylene and the hydrogen phosphide developing at high temperatures are avoided.

Since the quantities of each current of acetylene of both decomposition stages produced at a given moment can be measured separately after the gas has been cooled to a desired temperature, it is possible for the first time to determine the quantity of water necessary for the decomposition of the carbide in each stage of decomposition. Hitherto it was only possible to measure the total volume of gas, and thus not possible to ascertain the quantity of water necessary for the subsequent decomposition of the remaining carbide, with the result that either still undecomposed carbide rests remained in the calcium hydroxide, or the latter became so moist that operational disturbances occurred in the generator.

This method of working represents a considerable technical advance, but still further advantages can be achieved if, instead of sorted carbide of definite granulation, unsorted carbide is used for the manufacture of acetylene, and the method described above is followed in the same manner. By this method the expenses for the grinding of broken carbide and for sorting it are precluded.

But the expenses can be still further reduced if by the selection of definite crushing apparatuses, such as the "Symons" cone crusher or the "Short Head" type cone crusher, as high a content as possible of fine and finest particles is striven after when breaking the carbide blocks.

This signifies a great technical advance, since with these crushers it is easily possible with a comparatively small expenditure of electric power to obtain a carbide which is very rich in dust and with a maximum size of e. g. 30–35 mm.. It is also easily possible, if the molten carbide is disintegrated in the rotating cooling drums, to obtain a comparatively fine-grained carbide by varying the number of revolutions and the angle of inclination of the cooling drum. Hitherto when breaking the carbide blocks or when disintegrating the carbide in a cooling drum the opposite was always aimed at, i. e. to attain as small a portion of finest carbide as possible, an aim which is not, however, always easy to achieve. When decomposing carbide with a considerably fine carbide content, it is possible to first separate off this fine carbide in an undecomposed condition in the first part of the generator of the first stage before the carbide comes into contact with water; this is easily achieved if rotating drums fitted with sieves, rods, grates, slits, holes, etc., or regularly or irregularly agitated sieves, possibly arranged one below the other, with mesh wire, slits, grates, etc. are used as equipment for the first stage of the generation, and if care is also taken that a continual separating off of the fine carbide and of the calcium hydroxide occurring as the carbide decomposed with water is carried out. Since no water is added in the first part of this apparatus, the fine carbide is separated off undecomposed. The acetylene produced in the first stage of the generation by the decomposition of the carbide with water can be led off separately, cooled with water to a desired temperature, and the quantity of acetylene is measured. According to the quantity of acetylene produced in a unit of time the quantity of water necessary for the decomposition of the carbide can be ascertained. The solid material separated in the first stage of the generation for the gas-tight substance sealing then substantially consists largely of fine carbide and calcium hydroxide. In order to ensure a safe sealing of the gas the minimum level of the sealing should amount to at least two meters. This material is best conveyed into a kind of container with an automatic level-indicating device, so that a large stock of solid material can accumulate and serve as a buffer. Here it will depend upon the operating condition whether this container is arranged above the apparatus for the first stage of the generation and the carbide-calcium hydroxide mixture transported upwards by a suitable conveying device, or whether this conveying device is dispensed with, and the fine material separated in the first stage of the generation transported directly into a container installed beneath this generator.

From this sealing consisting of calcium hydroxide and carbide in the form of a container, the material is then conducted via a regulating device, e. g. a bucket wheel, to the decomposing device for the second stage, where it is treated in a suitable apparatus, e. g., in a plate apparatus similar to the Wedge oven (see U. S. Patent 1,947,120) or in another suitable apparatus, by reaction with water. The dosing of the quantity of water necessary here is determined as in the first stage by considering the quantity of acetylene developed in the unit of time by instantaneous indicator independent of the water required for the decomposition of the carbide in the first stage of the decomposition. The acetylene of each stage can be cooled down to any desired temperature after washing out and direct treatment with water, and each current can be measured separately; this was impossible with the processes hitherto known.

For a satisfactory dry decomposition of coarse-grained or unsorted carbide is only possible if in both stages of decomposition the quantity of water necessary for the partial decomposition of the carbide in the first stage, and above all for the total decomposition of the remaining carbide in the second stage and for the carrying off of the heat of reaction occurring in both stages, can be controlled with accuracy, since otherwise, particularly in the second stage, the calcium hydroxide is either obtained not entirely free from carbide or in an undesirably moist state. For this reason it is absolutely necessary that in the two decomposition stages, which are separated in a gas-tight manner and which however, possess a common passage for the solid reaction mixture formed, the acetylene developed in each stage in the unit of time can be measured accurately and separately, preferably at a desired temperature. Otherwise it is not possible to determine correctly the quantity of water necessary above all for the second generation stage, so that the content of free water in the calcium hydroxide varies.

Apart from the advantages described above, this process also ensures that demixing of the carbide, which is inevitable in the transport of unsorted carbide with a heavy carbide dust content, and which can lead to insurmountable difficulties in the decomposition, can cause no disturbance, since all the finely granulated and dust carbide contained in unsorted carbide is already separated off on entry into the first decomposition stage before it comes into contact with the decomposition water, thus avoiding among other difficulties violent thrusts of gas in the first stage. Furthermore, the process is particularly designed for the treatment of carbide with as high a dust content as possible, and for the generation in the second stage it is indeed desirable that calcium hydroxide is obtained with as high a content of fine carbide as possible—manufacturing conditions which had hitherto to be anxiously avoided. A higher carbide dust content is very desirable for the solid mixture arriving at the second generation stage also for the reason that the reaction heat occurring on the decomposition of the carbide is more sufficient for heating up the apparatus to such a degree that clogging is no longer to be feared. Also in this respect the above process constitutes a great technical advance.

In order to illustrate how our process may be carried out in practice, a suitable apparatus claimed in our co-pending application Serial No. 188,260, filed concurrently herewith, will now be described. Reference is made to the accompanying drawing in which Fig. 1 shows a vertical section through the entire apparatus, some parts being indicated schematically, and Fig. 2 shows a cross section along the line A—B of Fig. 1.

The unsorted carbide is conveyed via the carbide container 1 which is provided top and bottom with ball closures 72 and 35, to the carbide container 2 situated beneath with the ball closure 36 which is closed only if the generator is put out of operation. The carbide is carried continuously by the adjustable apportioning bucket wheel 3 which is driven by the regulating gear 37 by means of transmissions 38 and 39 by the motor 40 via the carbide shaking channel 4 (the motor of which is not shown in the drawing) into the rotating, slightly inclined drum 5 which is equipped with slits 2-3 mm. wide over the whole of its surface. A larger part of the fine-grained carbide and dust falls undecomposed through the slits 73 of the drum 5 directly into the transport device 6. The movement of the said transport device 6 takes place by means of the transmission 39. It is not shown in the drawing. The transport device 6 is situated beneath the sieve drum 5 and also acts as a mixing apparatus. The addition of water to the carbide is only made from the first third of the slit drum 5 onwards. The calcium hydroxide formed in the drum 5 by the decomposition of the carbide and any fine carbide remaining undecomposed are also thrown through the drum slits into the transport apparatus 6. The rotating sieve drum 5 is encased in a gas-tight stationary jacket 7, which tapers conically towards the bottom so that the transport device 6 forms the base of the stationary jacket 7. The addition of water for the decomposition of a large part of the carbide introduced is distributed by atomizing nozzles 9 fed through the hollow stationary shaft 8 onto the carbide present in the drum 5. For each nozzle 9 a separate piping is provided, which is not illustrated in the drawing; the individual pipings are combined in one tube. The nozzles 9 can be controlled individually and the water for each one can be measured, so that it is possible to adjust the supply of water to the manufacturing conditions. This is made still easier by sliding contact thermometers installed in the vicinity of the nozzles 9 for measuring the reaction temperature. These thermometers are not represented in the drawing. The acetylene developed in the drum leaves the slit drum 5 through the tube 10, which is equipped with a stationary clearance screw 11, in order to prevent clogging. The rotating drum 5 which is connected to the tube 10 is kept in slow motion by this tube 10; the tube 10 and the drum 5 rotate with 2–5 revolutions per minute. The tube 10 itself is driven by the toothed rim 41 driven by means of the small toothed wheel 42 by means of the general transmission 39. The number of revolutions of tube 10 and the number of revolutions of the rotating drum 5 may, if desired, be adapted to the working conditions by means of an interconnected regulating gear, not illustrated in the drawing. The tube 10 is sealed against outside air by stuffing boxes 43 and 44 indicated in the drawing, or other suitable devices. The clearance screw 11 is stationary so that it acts as scraper; it is fixed to the stationary hollow shaft 8. The acetylene is then introduced into the washing tower 12 in which it is freed from dust and hydrogen sulfide carried over with the gas by means of spraying with lime water. Here any particles of carbide possibly carried over with the gas are decomposed. The cooling down of the gas to the desired temperature is effected in the cooling tower 13 installed above the washing tower 12. The cooling tower 13 contains the filling material 45 which is deposited on the removable grate 46. The lime water is cycled by pumps, purified in settling tanks, and, by means of the distributing elements 14, which can be easily interchanged during operation and which are insensitive to clogging owing to their construction, the water being well distributed over the cross section of the washing tower 12. In order to prevent the penetration of the washing water into the rotating drum 5, the deflecting plate 15 is installed in the washing tower 12. The washing water leaves the tower 12 via the water seal 16 and is recycled. The quantity of gas developed hourly, after it has been brought down to the desired temperature by direct cooling with water in the cooling tower 13 by means of atomizing nozzles 47 is measured by a flow meter or a baffle plate 17.

By observing the quantity of gas developed hourly and the temperatures measured at the individual measuring points, and by considering the quantity of carbide introduced in the unit of time, the hourly quantity of water for the decomposition of the carbide is calculated and adjusted. The fine carbide and the mixture of calcium hydroxide and carbide discharged from the slit drum 5 are conveyed via the transport and mixing device 6 into the storage container 18, situated beneath. By the adjustment of a certain minimum level of material of about 2 meters—the level measuring device 49 is described later for the sluice 28 situated beneath the plate apparatus 22—the gas-tight sealing can be obtained with certainty. This may also work automatically, so that the operator has only to compensate for any variations in the supply of material by corresponding regulation of the water supply. From here the material mixture is conveyed via the adjustable bucket wheel 19 which is driven by the regulating gear 50 by means of the transmission 51, and the worm conveyor 20, which is driven by transmission 52 through the aperture 21 into an acetylene developer 22 designed as a plate apparatus. This generator consists of several round plates 23 arranged one beneath the other on the lines of a Wedge oven.

The total quantity of water necessary for the decomposition of the remaining carbide and for carrying off the heat of reaction is delivered onto the topmost plate of the plate apparatus 22 by various atomizing nozzles 24, and the material is gradually transported through the whole developer 22 with the aid of agitator arms 25, which are driven from the shaft 53 by means of the worm gears 54 and 55 and the reducing gear 56 by the motor 57. The agitator arms 25 are equipped with obliquely adjusted shovels, the material being moved on the individual plates from the outer edge inwards or from the center outwards, respectively. If for certain reasons the width of the slits 73 in the slit drum 5 is greater than 2–3 mm. and the material falling through thus of a correspondingly coarser grain, it may possibly prove advisable to add a small part of the water necessary for the decomposition of the carbide to the 2nd and 3rd plates also. In order to prevent clogging of the inner openings of the plates, clearance shovels 26 are installed which grasp over the edges of the plates. In order to prevent clogging of the outer, ring-shaped openings similarly constructed shovels 27 are employed. As a result of the relatively large surface which the fine carbide possesses as compared with the coarser one, the carbide decomposes in a very short period and arrives free from carbide in the sluice 28 located beneath the last plate. But in order to ensure the continuous absence of carbide from the calcium hydroxide even when slowly decomposing the carbide, it is left for at least ½ an hour in this sluice 28 according to the generation capacity of the developer 22, and is transported from the sluice 28 by the worm 29, the number of revolutions of which is adjustable by means of the regulating gear 58 which is driven by transmission 52 over the belt pulley 59. The regulation of the water for the decomposition of the residual carbide in the calcium hydroxide carbide mixture is effected in the manner described by relating the quantity of acetylene developed hourly to the quantity of calcium hydroxide carbide fed in hourly, considering also the kilowatt consumption consumed by the driver 53, which consumption can be read from the kilowatt meter 60 of the driving motor 57. For each individual generation capacity and for each type of generator it is easy to determine by experiment what the kilowatt consumption of the agitator motor should be for a certain desired content of free water in the calcium hydroxide. For example, if this consumption is 18 kw., then, if the current consumption is greater, say 19.5 kw., the addition of water must be correspondingly reduced, and vice versa. In order to prevent the acetylene from escaping into the open the calcium hydroxide in the sluice 28 is always maintained at a certain level of at least two meters. The measurement of the calcium hydroxide level is effected by the periodically swinging pendulum 30, ending in a plate. The motion of the pendulum 30 and thus the level of the calcium hydroxide in the sluice 28 is transmitted by a shaft to a graduated scale and/or automatically to a recording mechanism for checking purposes. Other measuring devices can of course also be employed. It is also possible to couple the adjustment of the calcium hydroxide with the discharge of the calcium hydroxide. The calcium hydroxide dust carried over with the gas developed is for the most part separated off in the upper extended part of the sluice 28 by considerable reduction of the speed of the gas current, and the acetylene leaves the developer 22 through the pipe 31, and is purified of the last remaining dust and of hydrogen sulfide in the washing tower 32. The measurement of the quantity of gas developed hourly is effected by a baffle plate 33, after the gas has been cooled down to the desired temperature by direct cooling by means of atomizing nozzle 61, in a second washing tower 62, filled with filling materials 63. The latter are deposited on a removable grate 64. Irrigation of the tower 32 is effected by means of distributing devices 65. The consumed water flows off over the siphon 66. The deflecting plate 67 prevents the entering of the water into the worm 31. 68 and 69 are the discharge funnels for the consumed water. The ferrosilicon which gradually accumulates in the slit drum 5 of the first stage of generation can be dropped from the slit drum 5 after a brief switching off of the apparatus at certain intervals into a sluice 34 arranged underneath the sieve drum 5 and provided with gas-tight closures top 48 and bottom 70. By means of the scraper 71 it is possible to remove cloggings in the exit.

We claim:

1. A two-stage continuous process for converting unsorted crushed calcium carbide into acetylene and dry calcium hydroxide by means of water, wherein the amount of acetylene produced in each stage is measured separately and such measurements are used to control accurately the dosage of water to each stage, which comprises in the first stage separating from such unsorted crushed calcium carbide the bulk of the fine-grained material and decomposing the bulk of the remaining coarse-grained material with just the required amount of water determined in accordance with the aforesaid measurements, conveying the calcium hydroxide thus formed together with fine-grained calcium carbide from the first stage to the second stage, while maintaining a gas-tight seal between the two stages by an accumulation of the calcium hydroxide and calcium carbide passing from one to the other, adding in the second stage just the required amount of water determined in accordance with the aforesaid measurements to decompose all of the unreacted calcium carbide conveyed thereto, and separately withdrawing and measuring the amounts of acetylene formed in each stage.

2. A process as claimed in claim 1 wherein the decomposition of the coarse-grained calcium carbide in the first stage takes place at a temperature slightly in excess of 100° C.

3. A process as claimed in claim 1 wherein the separate streams of acetylene formed in the two stages are each cooled to a predetermined temperature before being measured.

References Cited in the file of this patent

UNITED STATES PATENTS

| | | |
|---|---|---|
| 671,693 | Dickerson | Apr. 9, 1901 |
| 1,872,741 | Jane | Aug. 23, 1932 |
| 1,947,120 | Weibezahn et al. | Feb. 13, 1934 |
| 2,180,085 | Holler et al. | Nov. 14, 1939 |
| 2,343,185 | Holm et al. | Feb. 29, 1944 |